United States Patent
Lee et al.

(10) Patent No.: US 12,542,649 B2
(45) Date of Patent: Feb. 3, 2026

(54) ELECTRONIC APPARATUS FOR GENERATING HOMOMORPHIC ENCRYPTED MESSAGE AND METHOD THEREFOR

(71) Applicant: CRYPTO LAB INC., Seoul (KR)

(72) Inventors: Garam Lee, Seoul (KR); Younggi Lee, Seoul (KR); Hoseop Ahn, Gyeonggi-do (KR)

(73) Assignee: CRYPTO LAB INC., Seoul (KR)

( * ) Notice: Subject to any disclaimer, the term of this patent is extended or adjusted under 35 U.S.C. 154(b) by 298 days.

(21) Appl. No.: 18/356,609

(22) Filed: Jul. 21, 2023

(65) Prior Publication Data

US 2024/0039695 A1    Feb. 1, 2024

(30) Foreign Application Priority Data

Jul. 26, 2022   (KR) .................. 10-2022-0092748

(51) Int. Cl.
*H04L 9/00* (2022.01)
*G06F 7/491* (2006.01)
*H04L 9/30* (2006.01)

(52) U.S. Cl.
CPC ............ *H04L 9/008* (2013.01); *G06F 7/4915* (2013.01); *H04L 9/3093* (2013.01); *H04L 2209/04* (2013.01)

(58) Field of Classification Search
CPC ... H04L 9/008; H04L 2209/04; H04L 9/3093; G06F 7/4915
See application file for complete search history.

(56) References Cited

U.S. PATENT DOCUMENTS

| 2018/0198601 A1* | 7/2018 | Laine | H04L 9/3239 |
| 2020/0136798 A1* | 4/2020 | Kim | H04L 9/008 |
| 2021/0157932 A1* | 5/2021 | Blatt | H04L 9/0643 |
| 2023/0208611 A1 | 6/2023 | Cheon et al. | |

FOREIGN PATENT DOCUMENTS

| KR | 20200070121 A | 6/2020 |
| KR | 20220096223 A | 7/2022 |
| WO | 2021/256843 A1 | 12/2021 |

OTHER PUBLICATIONS

Office Action issued for Korean Patent Application No. 10-2022-0092748 filed on Jul. 26, 2022 on behalf of Crypto Lab Inc. Issuance Date Sep. 23, 2024. 13 page (English translation + original).

* cited by examiner

*Primary Examiner* — Ellen Tran
(74) *Attorney, Agent, or Firm* — Steinfl + Bruno LLP

(57) ABSTRACT

An electronic apparatus for generating a homomorphic encrypted message includes: a processor configured to generate a mask homomorphic encrypted message by homomorphically comparing the homomorphic encrypted message with the index data in case that a calculation command of the predetermined function for the homomorphic encrypted message is input, generate an intermediate homomorphic encrypted message by homomorphically multiplying the generated mask homomorphic encrypted message by the function result data, generate a function-result encrypted message for the homomorphic encrypted message by computing sum of values in a plurality of slots of the intermediate homomorphic encrypted message.

11 Claims, 5 Drawing Sheets

ELECTRONIC APPARATUS FOR GENERATING HOMOMORPHIC ENCRYPTED MESSAGE AND METHOD THEREFOR

CROSS-REFERENCE TO RELATED APPLICATION(S)

This application is claiming priority under of a Korean patent application number 10-2022-0092748, filed on Jul. 26, 2022, in the Korean Intellectual Property Office, the disclosure of which is incorporated by reference herein in its entirety.

BACKGROUND

Field

Apparatuses and methods consistent with the disclosure relate to an electronic apparatus for generating a homomorphic encrypted message and a method therefor, and more particularly, to an apparatus for generating a homomorphic encrypted message that generates a function-result homomorphic encrypted message for the homomorphic encrypted message by using a function value of a specific function in a plaintext state, and a method therefor.

Description of the Related Art

Various services for transmitting and receiving data between various devices are supported in accordance with the development of electronic and communication technologies. As one example of the various services, a cloud computing service in which a user stores his/her personal data or the like in a server, and uses the data in the server is also actively used.

In this environment, it is essential to use a security technology for preventing data leakage. Therefore, the server encrypts the data and stores the same. In this case, the server is required to decrypt the encrypted data in every case of searching for the stored data or performing a series of operations based on the data, which may cause waste of resources and time.

In addition, the personal data may be easily leaked to a third party in case that the data temporarily decrypted for calculation in the server is hacked by the third party.

A homomorphic encryption method is being studied to solve this problem. In case that the homomorphic encryption method is used, it is possible to acquire the same result as an encrypted value acquired by performing calculation on a plaintext even though the calculation is directly performed on the encrypted message without decrypting the encrypted data. Therefore, various calculations may be performed without decrypting the encrypted message.

A function value of a specific function may be required to perform the calculation in an encrypted message state. Here, the function value required for the corresponding function may depend on a specific value in the encrypted message, or have a very complex form, making it virtually impossible to implement an approximation function in the encrypted message state. In this case, it is inevitable to extract and use the required function value from a database where the function value is stored in a plaintext state.

SUMMARY

The disclosure aims to compare an input value in a homomorphic encrypted message state with an input value in a plaintext state by using a plaintext state database including a function value of a specific function, and acquire a desired function-result homomorphic encrypted message by using a homomorphic encrypted message generated as a result of the comparison.

According to an embodiment of the disclosure, an electronic apparatus for generating a homomorphic encrypted message includes: a memory storing at least one instruction, index data storing a plurality of input values each in a plurality of slots, and function result data storing a result value of a predetermined function for each of the plurality of input values in each of a plurality of slots; and a processor configured to execute the at least one instruction, wherein the processor is configured to generate a mask homomorphic encrypted message by homomorphically comparing the homomorphic encrypted message with the index data in case that a calculation command of the predetermined function for the homomorphic encrypted message is input, generate an intermediate homomorphic encrypted message by homomorphically multiplying the generated mask homomorphic encrypted message by the function result data, generate a function-result encrypted message for the homomorphic encrypted message by computing sum of values in a plurality of slots of the intermediate homomorphic encrypted message.

The index data and the function result data may have the same number of slots, and respectively have the input value and the result value of the predetermined function that corresponds to the input value in their slots at the same position.

The index data and the function result data may be plaintext state values.

The mask homomorphic encrypted message may have the same number of slots as the number of slots of the index data, a value in each slot of the mask homomorphic encrypted message may be a result value acquired by homomorphically comparing the index data with the homomorphic encrypted message in their slots at the same position, and the processor may be configured to homomorphically compare the homomorphic encrypted message with the index data by using an approximation function.

The intermediate homomorphic encrypted message may have the same number of slots as the number of slots of the function result data and the number of slots of the mask homomorphic encrypted message, and the value in each slot of the intermediate homomorphic encrypted message may be a value acquired by multiplying the value of the function result data in its slot at the same position by the value of the mask homomorphic encrypted message in its slot at the same position.

The function-result encrypted message may have a plurality of slots, and a value in each slot of the function-result encrypted message may be a value acquired by dividing the sum of the values in the plurality of slots of the intermediate homomorphic encrypted message by a predetermined value.

The predetermined function may be one of a cumulative probability distribution function for t distribution, chi-squared distribution, or F distribution, a factorial function, a permutation function, or a combination function.

According to another embodiment of the disclosure, a method for generating a homomorphic encrypted message of an electronic apparatus includes: generating a mask homomorphic encrypted message by homomorphically comparing the homomorphic encrypted message with index data storing a plurality of input values each in a plurality of slots in case that a calculation command of a predetermined function for the homomorphic encrypted message is input, generating an intermediate homomorphic encrypted message by homomorphically multiplying the generated mask homomorphic encrypted message by function result data storing a result value of the predetermined function for each of the plurality of input values in each of a plurality of slots, generating a function-result encrypted message for the homomorphic encrypted message by using sum of values in a plurality of slots of the intermediate homomorphic encrypted message.

DETAILED DESCRIPTION

Figure 1:
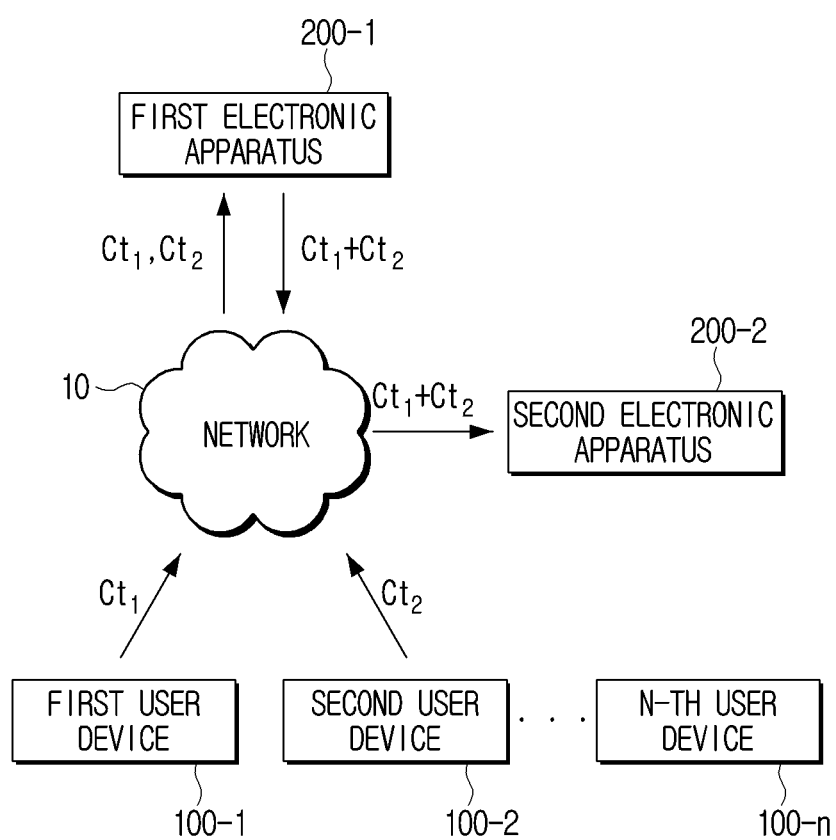
FIG. 1 is a view for explaining a structure of a network system according to an embodiment of the disclosure.

Hereinafter, the disclosure is described in detail with reference to the accompanying drawings. Encryption/decryption may be applied as necessary to a process of transmitting data (or information) that is performed in the disclosure, and an expression describing the process of transmitting the data (or information) in the disclosure and the claims should be interpreted as including cases of the encryption/decryption even if not separately mentioned. In the disclosure, an expression such as "transmitted/transferred from A to B" or "received by A from B" may include transmission/transfer or reception while having another medium included in the middle, and may not necessarily express only the direct transmission/transfer or reception from A to B.

In describing the disclosure, a sequence of each operation should be understood as non-restrictive unless a preceding operation in the sequence of each operation needs to logically and temporally precede a subsequent operation. That is, except for the above exceptional case, the essence of the disclosure is not affected even though a process described as the subsequent operation is performed before a process described as the preceding operation, and the scope of the disclosure should also be defined regardless of the sequence of the operations. In addition, in the specification, "A or B" may be defined to indicate not only selectively indicating either one of A and B, but also including both A and B. In addition, a term "including" in the disclosure may have a meaning encompassing further including other components in addition to components listed as being included.

The disclosure only describes essential components necessary for describing the disclosure, and does not mention components unrelated to the essence of the disclosure. In addition, it should not be interpreted as an exclusive meaning that the disclosure includes only the mentioned components, but should be interpreted as a non-exclusive meaning that the disclosure may include other components as well.

In addition, in the disclosure, a "value" may be defined as a concept that includes a vector or a polynomial form as well as a scalar value. In addition, in the disclosure, an expression such as "compute" or "calculate" may be replaced with an expression of generating a result of the corresponding computation or calculation. In addition, the calculation on encrypted messages described below may indicate homomorphic calculation unless otherwise mentioned. For example, addition of homomorphic encrypted messages may indicate homomorphic addition of two homomorphic encrypted messages.

Mathematical calculations or computations of each step in the disclosure described below may be implemented as computer calculations by a known coding method and/or coding designed to be suitable for the disclosure to perform the corresponding calculations or computations.

Specific equations described below are exemplarily described among possible alternatives, and the scope of the disclosure should not be construed as being limited to the equations mentioned in the disclosure.

For convenience of explanation the disclosure defines the following notations:

a←D: Select an element a according to distribution D.

s1, s2∈R: Each of S1 and S2 is an element belonging to a set R.

mod(q): Perform modular calculation with an element q.

$\lfloor - \rceil$: Round an internal value.

Hereinafter, various embodiments of the disclosure are described in detail with reference to the accompanying drawings.

FIG. 1 is a view for explaining a structure of a network system according to an embodiment of the disclosure.

Referring to FIG. 1, the network system may include a plurality of user devices 100-1 to 100-$n$, a first electronic apparatus 200-1, and a second electronic apparatus 200-2, and the respective components may be connected to each other through a network 10.

The network 10 may be implemented in any of various types of wired and wireless communication networks, broadcast communication networks, optical communication networks, cloud networks, or the like, and the respective devices may be connected to each other in a way such as wireless-fidelity (Wi-Fi), Bluetooth, near field communication (NFC), or the like without a separate medium.

Even though FIG. 1 shows the plurality of user devices 100-1 to 100-$n$, the plurality of user devices may not necessarily be used, and a single device may be used. For example, the user devices 100-1 to 100-$n$ may be implemented in various types of devices such as smartphones, tablets, game players, personal computers (PCs), laptop PCs, home servers, or kiosks, and may also be implemented in other types of home appliances each having an Internet of things (IoT) function.

A user may input various data through the user devices 100-1 to 100-$n$ used by the user. The input data may be directly stored in the user devices 100-1 to 100-$n$, and may also be transmitted and stored in an external device for storage capacity or a security reason. As shown in FIG. 1, the first electronic apparatus 200-1 may serve to store these data, and the second electronic apparatus 200-2 may serve to use some or all of the data stored in the first electronic apparatus 200-1.

Each of the user devices 100-1 to 100-$n$ may homomorphically encrypt the input data and transmit a homomorphic encrypted message to the first electronic apparatus 200-1.

Each of the user devices 100-1 to 100-*n* may include an error, i.e., an encryption noise computed in a process of performing the homomorphic encryption, in the encrypted message. In detail, the homomorphic encrypted message (or homomorphic ciphertext) generated by each of the user devices 100-1 to 100-*n* may be generated for a result value including the message and an error value to be restored in case that decryption is performed thereon using a secret key later.

For example, the homomorphic encrypted message generated by each of the user devices 100-1 to 100-*n* may be generated for the following properties to be satisfied in case that the message is decrypted using the secret key.

$$Dec(ct,sk) = <ct,sk> = M + e \pmod{q} \quad \text{[Equation 1]}$$

Here, < and > indicate dot-product calculation (or usual inner product), ct indicates the encrypted message, sk indicates the secret key, M indicates a plaintext message, e indicates an encryption error value, and mod q indicates a modulus of the encrypted message. Here, q needs to be chosen larger than a result value M multiplied by a scaling factor A to the message. In case that an absolute value of the error value e is sufficiently smaller than M, a decryption value M+e of the encrypted message may be a value that may replace an original message by the same precision in significant figure calculation. Among the decrypted data, the error may be disposed on the least significant bit (LSB) side, and M may be disposed on the next least significant bit side.

In case that a size of the message is too small or too large, the size may be adjusted using the scaling factor. In case that the scaling factor is used, not only a message in an integer form but also a message in a real number form may be encrypted, and its usability may thus be greatly increased. In addition, the size of the message may be adjusted using the scaling factor to thus also adjust a size of a region where the messages exist, i.e., effective region in the encrypted message after the calculation is performed.

In some embodiments, the modulus q of the encrypted message may be set and used in various forms. For example, the modulus of the encrypted message may be set in the form of an exponential power $q=Ä^L$ of the scaling factor Ä. If Ä is 2, the modulus may be set to a value such as $q=2^{10}$.

In addition, the homomorphic encrypted message according to the disclosure is described assuming that a fixed point is used. However, the homomorphic encrypted message may also be applied even in case that a floating point is used.

The first electronic apparatus 200-1 may store the received homomorphic encrypted message in an encrypted message state without the decryption.

The second electronic apparatus 200-2 may request a specific processing result of the homomorphic encrypted message from the first electronic apparatus 200-1. The first electronic apparatus 200-1 may perform specific calculation based on the request of the second electronic apparatus 200-2 and transmit the result to the second electronic apparatus 200-2.

For example, encrypted messages ct1 and ct2 transmitted by two user devices 100-1 and 100-2 may be stored in the first electronic apparatus 200-1. In this case, the second electronic apparatus 200-2 may request the sum of data provided from the two user devices 100-1 and 100-2 to the first electronic apparatus 200-1. The first electronic apparatus 200-1 may perform calculation of summing the two encrypted messages based on the request, and then transmit a result value ct1+ct2 to the second electronic apparatus 200-2.

Due to a nature of the homomorphic encrypted message, the first electronic apparatus 200-1 may perform the calculation without the decryption, and the result value may also be in a form of the encrypted message. In the disclosure, the result value acquired by the calculation is referred to as a calculation-result encrypted message.

The first electronic apparatus 200-1 may transmit the calculation-result encrypted message to the second electronic apparatus 200-2. The second electronic apparatus 200-2 may decrypt the received calculation-result encrypted message to thus acquire the calculation-result values of data included in each homomorphic encrypted message.

Meanwhile, FIG. 1 shows a case where the user devices 100-1 to 100-*n* perform the encryption, the first electronic apparatus 200-1 performs the calculations requested by the second electronic apparatus 200-2, and the second electronic apparatus 200-2 performs the decryption on the homomorphic encrypted message received from the first electronic apparatus 200-1. However, the disclosure is not necessarily limited thereto.

For example, one electronic apparatus 200 may perform the operations performed by the first electronic apparatus 200-1 and the second electronic apparatus 200-2. That is, the electronic apparatus 200 may perform the calculation on the homomorphic encrypted message and decrypt the calculation-result encrypted message including the calculation-result value.

Meanwhile, in another example, the user devices 100-1 to 100-*n*, the first electronic apparatus 200-1 and the second electronic apparatus 200-2 of FIG. 1 may be implemented as one electronic apparatus 200, and the electronic apparatus 200 may perform the homomorphic encryption on the message, perform the calculation on the homomorphic encrypted message, and then decrypt the calculation-result encrypted message including the calculation-result value.

Figure 2:
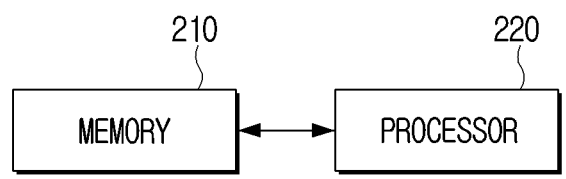
FIG. 2 is a block diagram for explaining a configuration of an electronic apparatus according to an embodiment of the disclosure.

FIG. 2 is a block diagram for explaining a configuration of the electronic apparatus according to an embodiment of the disclosure.

As shown in FIG. 2, the electronic apparatus 200 may include a memory 210 and a processor 220. Here, the electronic apparatus 200 may be any of various devices such as a personal computer (PC), a laptop computer, a smartphone, a tablet, or a server.

The memory 210 may store at least one instruction related to the electronic apparatus 200. For example, the memory 210 may store various programs (or software) for operating the electronic apparatus 200 according to various embodiments of the disclosure.

The memory 210 may be implemented in any of various forms such as a random access memory (RAM), a read-only memory (ROM), a buffer, a cache, a flash memory, a hard disk drive (HDD), an external memory, and a memory card, and is not limited to any one of these forms.

The memory 210 may store a message to be encrypted. Here, the messages may be various credit data, personal data, or the like cited by the user in various ways, and may also be data on a usage history such as position data or internet usage time data, used by the electronic apparatus 200.

The memory 210 may store a public key. In case that the electronic apparatus 200 directly generates the public key, the memory 210 may store not only the secret key but also various parameters necessary for generating the public key and the secret key.

In addition, the memory 210 may store the homomorphic encrypted message generated in a process described below.

In addition, the memory 210 may store the homomorphic encrypted message that is a result of a calculation process described below.

In addition, the memory 210 may store a function value required for the calculation process of the homomorphic encrypted message. The memory 210 may store the function value of a specific function in the form of a data frame. In detail, the memory 210 may store index data storing a plurality of input values each in a plurality of slots and function result data storing a result value of each of the plurality of input values in each of a plurality of slots.

Here, the memory 210 may store the function value of a specific function in a plaintext state. That is, the index data and the function result data, stored in the memory 210, may be plaintext state values.

The processor 220 may control an overall operation of the electronic apparatus 200. For example, the processor 220 may control the overall operation of the electronic apparatus 200 by executing at least one instruction stored in the memory 210. The processor 220 may include a single device such as a central processing unit (CPU) or an application-specific integrated circuit (ASIC), or may include a plurality of devices such as the CPU and a graphics processing unit (GPU).

In case that the plaintext message or the homomorphic encrypted message is input, the processor 220 may store the input plaintext message or homomorphic encrypted message in the memory 210. In addition, the processor 220 may homomorphically encrypt the message or decrypt the homomorphic encrypted message by using various set values and programs stored in the memory 210. In this case, the processor 220 may use the public key and the secret key.

The processor 220 may generate and use the public key and the secret key which are required to directly perform the encryption and the decryption, or may receive and use the keys from the external device. For example, the processor 220 may generate the public key and the secret key and distribute the public key to other external devices.

In case of directly generating the key, the processor 220 may generate the public key by using a Ring-LWE method. For example, the processor 220 may first set the various parameters and Rings and store the same in the memory 210. Examples of the parameters may include a length of a plaintext message bit, a size of the public key, a size of the secret key, and the like.

The Ring may be expressed as Equation 2 below.

$$R = \frac{Z_q[X]}{f(x)} \qquad [\text{Equation 2}]$$

Here, R indicates the Ring, $Z_q$ indicates a coefficient, and $f(x)$ indicates an n-th order polynomial.

The Ring indicates a set of polynomials having predetermined coefficients, and indicates the set in which addition and multiplication are defined between elements and are closed for the addition and multiplication. The Ring may be referred to as a ring.

For example, the ring indicates a set of the n-th order polynomials having the coefficient $Z_q$. For example, in case that n indicates $\Phi(N)$, the ring indicates an N-th cyclotomic polynomial. Here, $f(x)$ indicates ideal of $Z_q[x]$ generated by $f(x)$. The Euler totient function $\Phi(N)$ indicates the number of natural numbers that are prime to N and smaller than N. If $\Phi_N(x)$ is defined as the n-th cyclotomic polynomial, the ring may also be expressed in Equation 3 as follows. Here, N may be $2^{17}$.

$$R = \frac{Z_q[X]}{\Phi_N(x)} \qquad [\text{Equation 3}]$$

The secret key sk may be expressed as follows.

Meanwhile, the ring of Equation 3 described above has a complex number in a plaintext space. Meanwhile, only a set in which the plaintext space is a real number among the sets of rings described above may be used to improve a speed for calculating the homomorphic encrypted message.

In case that the ring is set, the processor 220 may compute the secret key sk from the ring.

$$sk \leftarrow (1, s(x)), s(x) \in R \qquad [\text{Equation 4}]$$

Here, $s(x)$ indicates a random polynomial generated using a small coefficient.

In addition, the processor 220 may compute a first random polynomial $a(x)$ from the ring. The first random polynomial may be expressed as follows.

$$a(x) \leftarrow R \qquad [\text{Equation 5}]$$

In addition, the processor 220 may compute the error. For example, the processor 220 may extract the error from a discrete Gaussian distribution or a distribution having a statistical distance close thereto. This error may be expressed as follows.

$$e(x) \leftarrow D^n_q \qquad [\text{Equation 6}]$$

In case that the error is computed, the processor 220 may compute a second random polynomial by modularly calculating the error in the first random polynomial and the secret key. The second random polynomial may be expressed as follows.

$$b(x) = -a(x)s(x) + e(x) \pmod{q} \qquad [\text{Equation 7}]$$

Finally, a public key pk is set to include the first random polynomial and the second random polynomial as follows.

$$pk = (b(x), a(x)) \qquad [\text{Equation 8}]$$

The method for generating the key described above is only an example, the disclosure is not necessarily limited thereto, and the public key and the secret key may be generated by another method.

Meanwhile, in case that the public key is generated, the processor 220 may control a communication device (not shown) to transmit the generated public key to another device.

In addition, the processor 220 may generate the homomorphic encrypted message for the message. For example, the processor 220 may generate the homomorphic encrypted message by applying a previously-generated public key to the message.

In case that the generated homomorphic encrypted message is decrypted, the message may be restored as the result value acquired by adding the error to a value reflecting the scaling factor to the message. The scaling factor may use a value previously input and set.

Alternatively, the processor 220 may perform the encryption by using the public key immediately after multiplying the message by the scaling factor. In this case, the error computed in an encryption process may be added to the result value acquired by multiplying the message by the scaling factor.

In addition, the processor 220 may generate the encrypted message to have a length corresponding to a size of the scaling factor.

In case that the homomorphic encrypted message is generated, the processor 220 may store the encrypted message in the memory 210 or control the communication device (not shown) to transmit the homomorphic encrypted message to another device based on a user request or a predetermined default instruction.

In case that the homomorphic encrypted message is required to be decrypted, the processor 220 may apply the secret key to the homomorphic encrypted message to generate a polynomial decrypted text, and decode the polynomial decrypted text to generate the message. Here, the generated message may include the error as mentioned in Equation 1 described above.

Meanwhile, the processor 220 may receive a calculation command of a predetermined function for the homomorphic encrypted message. Here, the predetermined function may have a function value in a very complex form, and thus be virtually impossible to be implemented in the encrypted message state. For example, the predetermined function may be one of a cumulative probability distribution function for t distribution, chi-squared distribution, or F distribution, a factorial function, a permutation function, or a combination function.

In this case, the processor 220 may generate a function-result encrypted message including a predetermined function-calculation result for the homomorphic encrypted message by using the function value of the predetermined function in the plaintext state that is stored in the memory 210.

A detailed description thereof is provided below with reference to FIG. 3.

Figure 3:
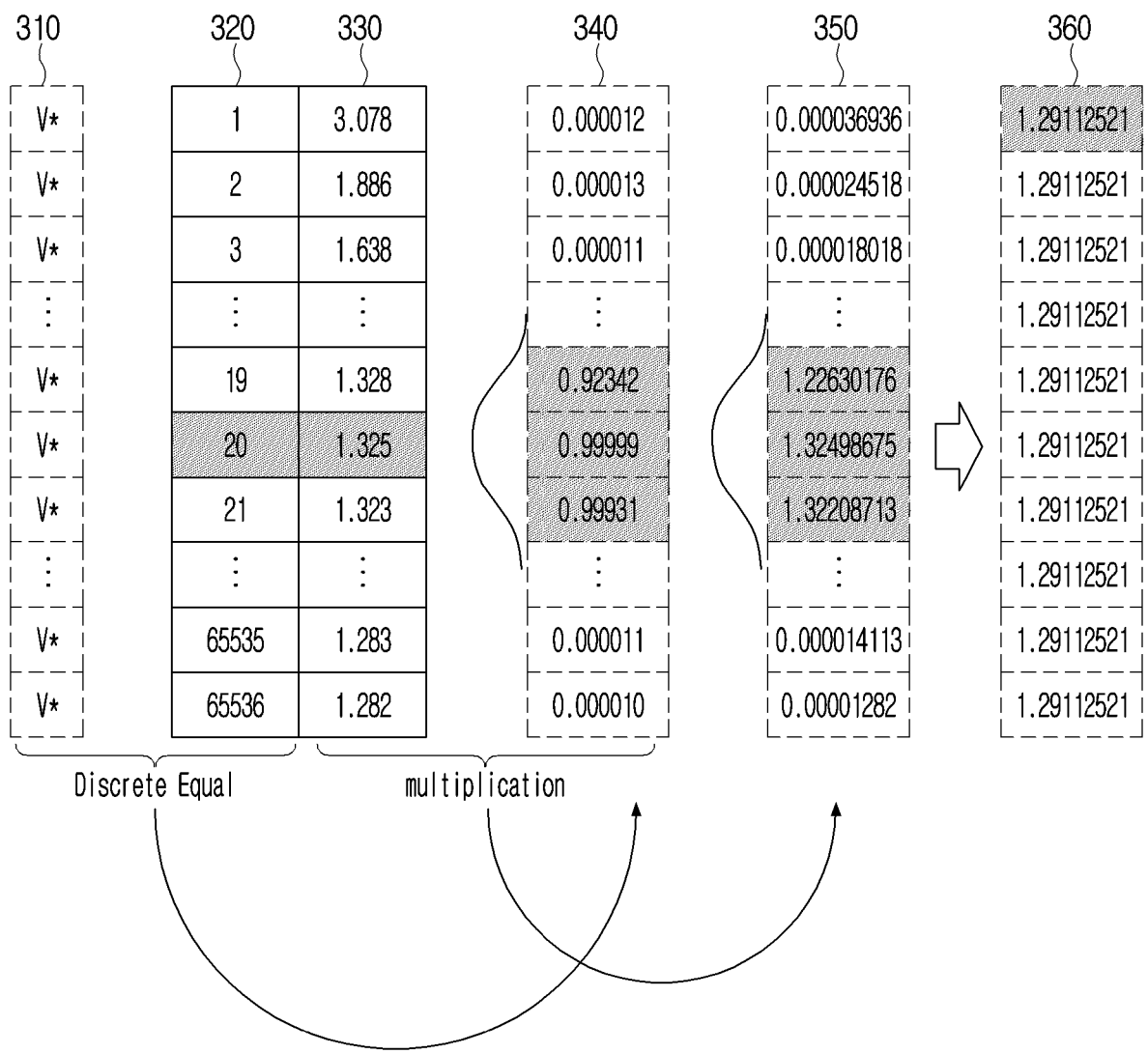
FIG. 3 is a view for explaining the electronic apparatus for generating a function-result encrypted message by using a function value of a specific function in a plaintext state according to an embodiment of the disclosure.

FIG. 3 is a view for explaining the electronic apparatus for generating the function-result encrypted message by using the function value of a specific function in the plaintext state according to an embodiment of the disclosure.

Index data 320 and function result data 330 are shown in solid lines in FIG. 3, which indicates that each of the index data 320 and the function result data 330 is in the plaintext state.

As shown in FIG. 3, the index data 320 and the function result data 330 may have the same number of slots. In addition, the index data 320 and the function result data 330 may respectively have the input value and a result value of the predetermined function that corresponds to the input value in their slots at the same position. For example, the index data 320 may have an input value ik in its slot at a k-th position, and the function result data 320 may have a result value jk of the predetermined function that corresponds to the input value ik in its slot at the k-th position. As described above with reference to FIG. 2, the predetermined function may have the function value in a very complex form, and thus be virtually impossible to be implemented in the encrypted message state; and may be one of the cumulative probability distribution function for t distribution, chi-squared distribution, or F distribution, the factorial function, the permutation function, or the combination function.

A homomorphic encrypted message 310, a mask homomorphic encrypted message (or a mask homomorphic ciphertext) 340, an intermediate homomorphic encrypted message (or intermediate homomorphic ciphertext) 350, and a function-result encrypted message 360 are shown in dotted lines in FIG. 3, which indicates that each of the homomorphic encrypted message 310, the mask homomorphic encrypted message 340, the intermediate homomorphic encrypted message 350, and the function-result encrypted message 360 is in the encrypted message state.

The processor 220 may receive a calculation command of the predetermined function for the homomorphic encrypted message 310.

Here, the processor 220 may receive the homomorphic encrypted message 310 from the external device (not shown) or generate the homomorphic encrypted message 310.

The homomorphic encrypted message 310 may have the same number of slots as the number of slots of the index data 320, and the same value may be input to each slot of the homomorphic encrypted message 310. The value input to each slot of the homomorphic encrypted message 310 may be a value corresponding to an input value of the function.

For example, the function result data 330 in FIG. 3 may be a table storing a result value of the cumulative probability distribution function for the t distribution, and the index data 320 may be a table storing an input value of the cumulative probability distribution function for the t distribution. The processor 220 may receive or generate the homomorphic encrypted message 310 storing an input value v* in each of the same number of slots as those (e.g., 65,536) of the index data 320.

The processor 220 may generate the mask homomorphic encrypted message 340 by homomorphically comparing the homomorphic encrypted message 310 with the index data 320 storing the input value of the predetermined function in case that the calculation command of the predetermined function for the homomorphic encrypted message 310 is input.

The processor 220 may homomorphically compare the homomorphic encrypted message 310 with the index data 320 by using an approximation function. In detail, the processor 220 may homomorphically compare the homomorphic encrypted message 310 in the encrypted message state with the index data 320 in the plaintext state by using the approximation function such as a (discrete) equal approximation function.

The mask homomorphic encrypted message 340 generated as a result of homomorphically comparing the homomorphic encrypted message 310 with the index data 320 may have the same number of slots as the number of slots of the index data 320. A value in each slot of the mask homomorphic encrypted message 340 may be a result value acquired by homomorphically comparing the index data 320 with the homomorphic encrypted message, in their slots at the same position.

Here, the value included in each slot of the mask homomorphic encrypted message 340 may be a value within a range of zero to 1. In detail, the value in each slot of the mask homomorphic encrypted message 340 may be close to 1 in case that the two values are the same as each other, and close to zero in case that the two values are different from each other as a result of homomorphically comparing the value included in each slot of the homomorphic encrypted message 310 with the value included in each slot of the index data 320. At least one value close to 1 may exist among the values included in the respective slots of the mask homomorphic encrypted message 340 based on the function result data 330. A distribution graph of FIG. 3 that is shown next to the mask homomorphic encrypted message 340 indicates that there are several values close to 1.

In addition, the processor 220 may generate the intermediate homomorphic encrypted message 350 by homomorphically multiplying the mask homomorphic encrypted message 340 by the function result data 330.

Here, the intermediate homomorphic encrypted message 350 may have the same number of slots as the number of slots of the mask homomorphic encrypted message 340 and the number of slots of the function result data 330. A value in each slot of the intermediate homomorphic encrypted message 350 may be a value acquired by multiplying a value of the function result data 330 in its slot at the same position by a value of the mask homomorphic encrypted message 340 in its slot at the same position. For example, a value in an i-th slot of the intermediate homomorphic encrypted message 350 may be a value acquired by multiplying a value in an i-th slot of the mask homomorphic encrypted message 340 by a value in an i-th slot of the function result data 330. A distribution graph of FIG. 3 that is shown next to the intermediate homomorphic encrypted message 350 indicates that there are several values close to 1.

The processor 220 may generate the function-result encrypted message 360 for the homomorphic encrypted message by using sum of values in a plurality of slots of the intermediate homomorphic encrypted message 350. The function-result encrypted message 360 may have a plurality of slots, and the number of slots of the function-result encrypted message 360 may be the same as the number of slots of the mask homomorphic encrypted message 340 or the number of slots of the intermediate homomorphic encrypted message 350.

A value in each slot of the function-result encrypted message 360 may be an average approximate value in the plurality of slots of the intermediate homomorphic encrypted message.

In detail, the value in each slot of the function-result encrypted message 360 may be a value acquired by dividing the sum of the values in the plurality of slots of the intermediate homomorphic encrypted message 350 by a predetermined value. Here, the predetermined value may indicate the number of slots having a value within a predetermined range among the plurality of slots of the mask homomorphic encrypted message 340. For example, the predetermined value may indicate the number of slots having a value greater than 0.9 and less than or equal to 1 among the plurality of slots of the mask homomorphic encrypted message 340.

The processor 220 may use a first slot of the function-result encrypted message 360 for performing the calculation in the encrypted message state. However, this configuration is only an example, and the processor 220 may use one slot among the plurality of slots included in the function-result encrypted message 360.

Figure 4:
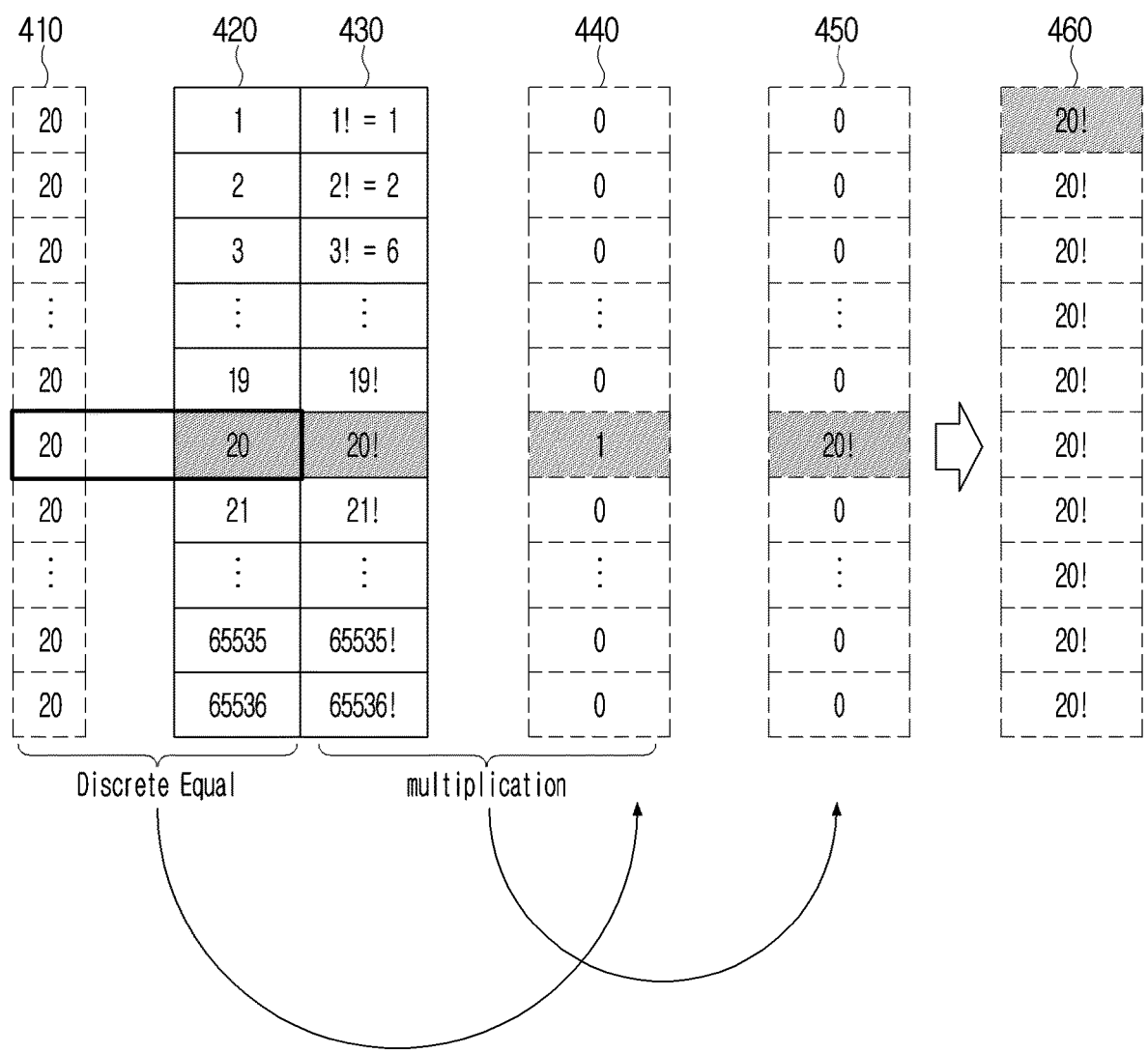
FIG. 4 is a view for explaining the electronic apparatus for generating a function-result encrypted message in case that the function value of a specific function in a plaintext state is a natural number according to an embodiment of the disclosure.

FIG. 4 is a view for explaining the electronic apparatus for generating the function-result encrypted message in case that the input value or function value of a specific function is a natural number according to an embodiment of the disclosure. Descriptions overlapping with those provided with reference to FIG. 3 are omitted for convenience of explanation.

Index data 420 and function result data 430 are shown in solid lines, as in FIG. 3, which indicates that each of the index data 420 and the function result data 430 is in the plaintext state.

The index data 420 and the function result data 430 may have natural number values. For example, a function used to acquire the function result data 430 may be the factorial function, the permutation function, or the combination function. In this case, the index data 420 and the function result data 430 may include natural numbers. For example, the function result data 430 of FIG. 4 may store a result value of the factorial function corresponding to an input value in each of a plurality of slots.

The processor 220 may receive a homomorphic encrypted message 410 from the external device (not shown) or generate the homomorphic encrypted message 410. The homomorphic encrypted message 410 may have the same number of slots as the number of slots of the index data 420, and the same value may be input to each slot of the homomorphic encrypted message 410. The value input to each slot of the homomorphic encrypted message 410 may be a value corresponding to an input value of the predetermined function. In a case of FIG. 4, the input value of the predetermined function is the natural number, and the value input to each slot of the homomorphic encrypted message 410 may thus be the natural number.

In case that the calculation command of the predetermined function for the homomorphic encrypted message 410 is input, the processor 220 may generate a mask homomorphic encrypted message 440 by homomorphically compare the homomorphic encrypted message 410 with the index data 320 storing the input value of the predetermined function. In detail, the processor 220 may homomorphically compare the homomorphic encrypted message 410 in the encrypted message state with the index data 420 in the plaintext state by using the (discrete) equal approximation function.

In the case of FIG. 4, the value included in each slot of the index data 420 and the value in each slot of the homomorphic encrypted message 410 are the natural numbers, and a value in each slot of the mask homomorphic encrypted message 440 may be zero or 1. In detail, the value in each slot of the mask homomorphic encrypted message 440 may be 1 in case that the value of the index data 420 and the value of the homomorphic encrypted message 410 in their slots at the same position are the same as each other, and zero in case that the two values are different from each other.

In addition, the processor 220 may generate an intermediate homomorphic encrypted message 450 by homomorphically multiplying the mask homomorphic encrypted message 440 by the function result data 430.

Here, the intermediate homomorphic encrypted message 450 may have the same number of slots as those of the mask homomorphic encrypted message 440 and those of the function result data 430. A value in each slot of the intermediate homomorphic encrypted message 450 may be acquired by multiplying a value of the function result data 430 in its slot at the same position by a value of the mask homomorphic encrypted message 440 in its slot at the same position. For example, a value in an i-th slot of the intermediate homomorphic encrypted message 450 may be a value acquired by multiplying a value in an i-th slot of the mask homomorphic encrypted message 440 by a value in an i-th slot of the function result data 430.

The mask homomorphic encrypted message 440 has the value of 1 or zero, and the value in each slot of the intermediate homomorphic encrypted message 450 may be one of function values of the function result data 430 or zero. In detail, a value of the function result data 430 in its slot at the same position as a slot of the mask homomorphic encrypted message 440 that has the value of 1 among the plurality of slots thereof may be included in a slot of the intermediate homomorphic encrypted message 450 at the same position, and zero may be included in the other slots of the intermediate homomorphic encrypted message 450.

The processor 220 may generate a function-result encrypted message 460 for the homomorphic encrypted message by using sum of the values in the plurality of slots of the intermediate homomorphic encrypted message 450. The value included in each slot of the intermediate homomorphic encrypted message 450 may be one of the function values of the function result data 430 or zero, and the description thus omits the average approximation process described with reference to FIG. 3.

That is, the value in each slot of the function-result encrypted message 460 may be the sum of the values in the plurality of slots of the intermediate homomorphic encrypted message 450.

The processor 220 may use a first slot of the function-result encrypted message 460 for performing the calculation in the encrypted message state. However, this configuration is only an example, and the processor 220 may use one slot among the plurality of slots included in the function-result encrypted message 460.

Figure 5:
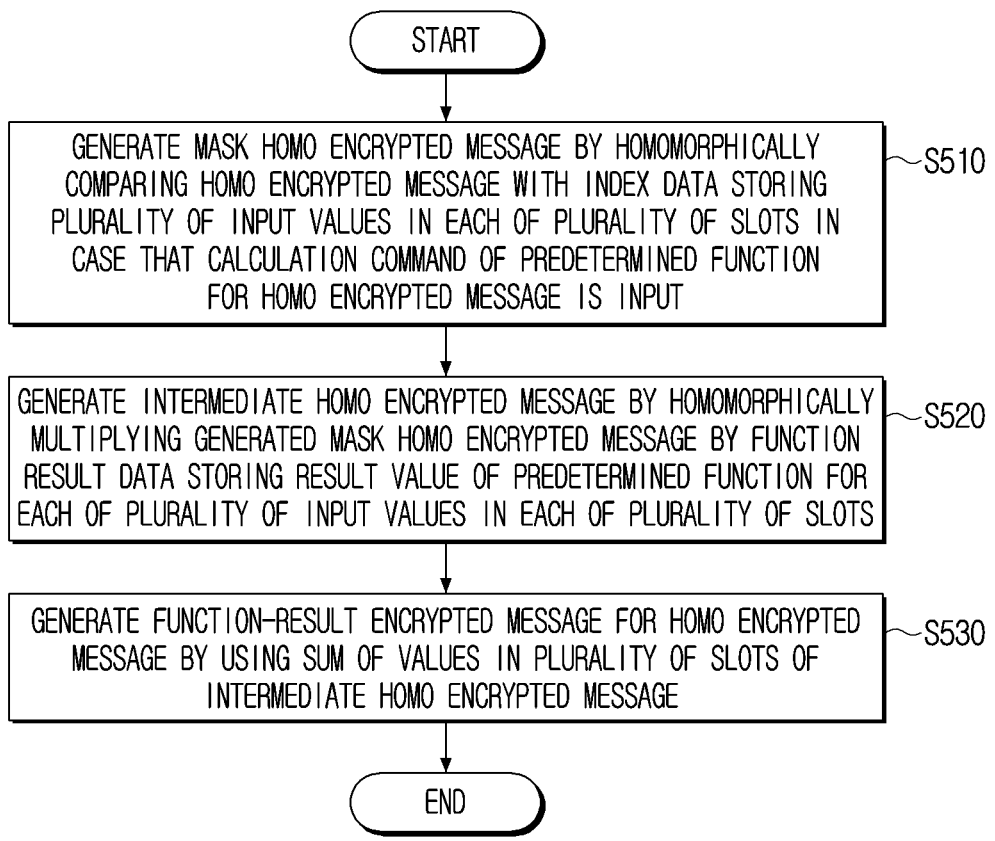
FIG. 5 is a view for explaining a method for generating a function-result encrypted message according to another embodiment of the disclosure.

FIG. 5 is a view for explaining a method for generating a function-result encrypted message according to another embodiment of the disclosure.

The electronic apparatus may first receive a calculation command of a predetermined function for a homomorphic encrypted message. Here, the predetermined function may have a function value in a very complex form, and thus be virtually impossible to be implemented in an encrypted message state; and may be one of a cumulative probability distribution function for t distribution, chi-squared distribution, or F distribution, a factorial function, a permutation function, or a combination function.

An electronic apparatus 200 may receive the homomorphic encrypted message from an external device, or the electronic apparatus 200 may directly generate the homomorphic encrypted message. The homomorphic encrypted message may have the same number of slots as the number of slots of index data storing a plurality of input values each in a plurality of slots, and the homomorphic encrypted message may have the same value in each slot thereof.

The method may include generating a mask homomorphic encrypted message by homomorphically comparing the homomorphic encrypted message with the index data storing the plurality of input values in each of the plurality of slots in case that the calculation command of the predetermined function for the homomorphic encrypted message is input (S510).

In detail, the mask homomorphic encrypted message may be generated by homomorphically comparing the homomorphic encrypted message with the index data by using an approximation function such as a (discrete) equal approximation function.

Here, the mask homomorphic encrypted message may have the same number of slots as the number of slots of the index data, and a value in each slot of the mask homomorphic encrypted message may be a result value acquired by homomorphically comparing the index data with the homomorphic encrypted message in their slots at the same position.

The value in each slot of the mask homomorphic encrypted message may be a value within a range of zero to 1. In detail, the value in each slot of the mask homomorphic encrypted message may be close to 1 in case that two values are the same as each other, and close to zero in case that the two values are different from each other as a result of homomorphically comparing the value included in each slot of the homomorphic encrypted message with the value included in each slot of the index data.

In addition, the method may include generating an intermediate homomorphic encrypted message by homomorphically multiplying the generated mask homomorphic encrypted message by function result data storing a result value of the predetermined function for each of the plurality of input values in each of the plurality of slots (S520).

Here, the index data and the function result data may have the same number of slots, and respectively have an input value and a result value of the predetermined function that corresponds to the input value in their slots at the same position. Here, the index data and the function result data may be plaintext state values.

The generated intermediate homomorphic encrypted message may include the same number of slots as the number of slots of the function result data and the number of slots of the mask homomorphic encrypted message.

The value in each slot of the intermediate homomorphic encrypted message may be a value acquired by multiplying the value of the function result data in its slot at the same position by the value of the mask homomorphic encrypted message in its slot at the same position in its slot at the same position. For example, a value in an i-th slot of the intermediate homomorphic encrypted message may be a value acquired by multiplying a value in an i-th slot of the mask homomorphic encrypted message by a value in an i-th slot of the function result data.

The method may include generating the function-result encrypted message for the homomorphic encrypted message by using sum of the values in the plurality of slots of the intermediate homomorphic encrypted message (S530).

The function-result encrypted message may have a plurality of slots, and a value in each slot of the function-result encrypted message may be a value acquired by dividing the sum of the values in the plurality of slots of the intermediate homomorphic encrypted message by a predetermined value. Here, the predetermined value may indicate the number of slots having a value within a predetermined range among the plurality of slots of the mask homomorphic encrypted message. For example, the predetermined value may indicate the number of slots having a value greater than 0.9 and less than or equal to 1 among the plurality of slots of a mask homomorphic encrypted message 340.

The method may use a first slot of the function-result encrypted message for performing the calculation in the encrypted message state.

The various operations described above as being performed by the electronic apparatus 200 may be performed by one or more electronic apparatuses in the form of a control method or an operation method of a system including the electronic apparatus.

Meanwhile, the various embodiments of the disclosure described above may be implemented in a computer or a computer-readable recording medium using software, hardware, or a combination of software and hardware.

According to hardware implementation, the embodiments described in the disclosure may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or electric units for performing other functions.

Meanwhile, a computer instruction for performing the method for generating the homomorphic encrypted message of the electronic apparatus according to the various embodiments of the disclosure described above may be stored in a non-transitory computer-readable medium. The computer instructions stored in the non-transitory computer-readable medium allow a specific device to perform the processing operations of the user device or the administrator device according to the various embodiments described above in case that the instructions are executed by a processor of the specific device described above.

The non-transitory computer-readable medium is not a medium that stores data therein for a while, such as a register, a cache, or a memory, and indicates a medium that semi-permanently stores data therein and is readable by the machine. In detail, the various applications or programs described above may be stored and provided in the non-transitory computer readable medium such as a compact disk (CD), a digital versatile disk (DVD), a hard disk, a Blu-ray disk, a universal serial bus (USB), a memory card, or a read only memory (ROM).

Although the embodiments of the disclosure have been shown and described, the disclosure is not limited to the above-described specific embodiments, and may be variously modified by those skilled in the art to which the disclosure pertains without departing from the spirit and scope of the disclosure as claimed in the claims. In addition, such modifications should also be understood to fall within the scope of the disclosure.

What is claimed is:

1. An electronic apparatus for processing a homomorphic ciphertext, the apparatus comprising:
    a memory storing at least one instruction, index data, and function result data; and
    a processor configured to execute the at least one instruction,
    wherein the index data includes a plurality of slots, each slot of the index data storing a particular input value, the function result data includes the same number of slots as the index data, each slot of the function result data storing a value obtained by applying a predetermined function to an input value at the same slot position of the index data,
    wherein the processor is further configured to:
    receive an instruction to perform the predetermined function on an input homomorphic ciphertext;
    generate a mask ciphertext having the same number of slots as the index data by performing a homomorphic comparison between the input homomorphic ciphertext and the index data, each slot of the mask ciphertext indicating a comparison result;
    generate an intermediate ciphertext by performing homomorphic multiplication between the mask ciphertext and the function result data; and
    generate a result ciphertext by summing values across the plurality of slots of the intermediate ciphertext.

2. The apparatus as claimed in claim 1, wherein the index data and the function result data are plaintext values.

3. The apparatus as claimed in claim 1, wherein
    the value in each slot of the intermediate homomorphic ciphertext is a value acquired by multiplying the value of the function result data in its slot at the same position by the value of the mask homomorphic ciphertext in its slot at the same position.

4. The apparatus as claimed in claim 1, wherein the result ciphertext has a plurality of slots, and
    a value in each slot of the result ciphertext is a value acquired by dividing a sum of values across the plurality of slots of the intermediate homomorphic ciphertext by a predetermined value.

5. The apparatus as claimed in claim 1, wherein the predetermined function is one of a cumulative probability distribution function for t distribution, chi-squared distribution, or F distribution, a factorial function, a permutation function, or a combination function.

6. A method for processing a homomorphic ciphertext of an electronic apparatus, the method comprising:
    storing index data and function result data, the index data includes a plurality of slots, each slot of the index data storing a particular input value, the function result data includes the same number of slots as the index data, each slot of the function result data storing a value obtained by applying a predetermined function to an input value at the same slot position of the index data;
    receiving an instruction to perform the predetermined function on an input homomorphic ciphertext;
    generating a mask ciphertext having the same number of slots as the index data by performing a homomorphic comparison between the input homomorphic ciphertext and the index data, each slot of the mask ciphertext indicating a comparison result;
    generating an intermediate ciphertext by performing homomorphic multiplication between the mask ciphertext and the function result data; and
    generating a result ciphertext by summing values across the plurality of slots of the intermediate ciphertext.

7. The method as claimed in claim 6, wherein the index data and the function result data are plaintext values.

8. The method as claimed in claim 6, wherein
    the value in each slot of the intermediate homomorphic ciphertext is a value acquired by multiplying the value of the function result data in its slot at the same position by the value of the mask homomorphic ciphertext in its slot at the same position.

9. The method as claimed in claim 6, wherein the result ciphertext has a plurality of slots, and
    a value in each slot of the result ciphertext is a value acquired by dividing a sum of values across the plurality of slots of the intermediate homomorphic ciphertext by a predetermined value.

10. The method as claimed in claim 6, wherein the predetermined function is one of a cumulative probability distribution function for t distribution, chi-squared distribution, or F distribution, a factorial function, a permutation function, or a combination function.

11. A non-transitory computer-readable recording medium which includes a program for executing a method for processing a homomorphic ciphertext, wherein the method includes:
    storing index data, and function result data;
    the index data includes a plurality of slots, each slot of the index data storing a particular input value,
    the function result data includes the same number of slots as the index data, each slot of the function result data storing a value obtained by applying a predetermined function to an input value at the same slot position of the index data;
    receiving an instruction to perform the predetermined function on an input homomorphic ciphertext;
    generating a mask ciphertext having the same number of slots as the index data by performing a homomorphic comparison between the input homomorphic ciphertext and the index data, each slot of the mask ciphertext indicating a comparison result;
    generating an intermediate ciphertext by performing homomorphic multiplication between the mask ciphertext and the function result data; and generating a result ciphertext by summing values across the plurality of slots of the intermediate ciphertext.

* * * * *